US012795638B2

(12) United States Patent
Cho et al.

(10) Patent No.: US 12,795,638 B2
(45) Date of Patent: Nov. 10, 2026

(54) CONFIGURED GRANT SMALL DATA TRANSMISSIONS IN AN UNLICENSED SPECTRUM

(71) Applicant: QUALCOMM Incorporated, San Diego, CA (US)

(72) Inventors: Hyunwoo Cho, San Diego, CA (US); Changhwan Park, San Diego, CA (US); Carlos Cabrera Mercader, Cardiff, CA (US); Ruiming Zheng, Beijing (CN); Jae Ho Ryu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 18/838,375

(22) PCT Filed: Apr. 24, 2022

(86) PCT No.: PCT/CN2022/088690

§ 371 (c)(1),
(2) Date: Aug. 14, 2024

(87) PCT Pub. No.: WO2023/205923

PCT Pub. Date: Nov. 2, 2023

(65) Prior Publication Data

US 2025/0159627 A1 May 15, 2025

(51) Int. Cl.
*H04W 24/08* (2009.01)
*H04W 24/10* (2009.01)
(Continued)

(52) U.S. Cl.
CPC .......... *H04W 72/115* (2023.01); *H04W 24/08* (2013.01); *H04W 24/10* (2013.01);
(Continued)

(58) Field of Classification Search
CPC ..... H04W 8/22–245; H04W 24/02–10; H04W 48/02–20; H04W 56/0005–0095;
(Continued)

(56) References Cited

U.S. PATENT DOCUMENTS

| | | | |
|---|---|---|---|
| 2019/0014570 | A1 | 1/2019 | Nam et al. |
| 2021/0112560 | A1 | 4/2021 | Khoshnevisan et al. |
| 2021/0136800 | A1 | 5/2021 | Li et al. |

FOREIGN PATENT DOCUMENTS

| | | | |
|---|---|---|---|
| WO | WO-2020145497 | A1 | 7/2020 |
| WO | WO-2022035762 | A1 | 2/2022 |

OTHER PUBLICATIONS

International Search Report and Written Opinion—PCT/CN2022/088690—ISA/EPO—Nov. 29, 2022.

(Continued)

*Primary Examiner* — Timothy J Weidner
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, a synchronization signal block (SSB). The UE may perform a measurement of the SSB during a measurement window for an unlicensed spectrum, wherein the measurement window is an extended measurement window as compared to a scheduled measurement window for a licensed carrier. The UE may transmit, based at least in part on the measurement of the SSB during the measurement window, a configured grant small data transmission (CG-SDT) in the unlicensed spectrum to the network entity, wherein the CG-SDT is based at least in part on a timing alignment validation after the measurement window. Numerous other aspects are described.

30 Claims, 10 Drawing Sheets

(51) Int. Cl.

| | |
|---|---|
| ***H04W 56/00*** | (2009.01) |
| ***H04W 72/0446*** | (2023.01) |
| ***H04W 72/0453*** | (2023.01) |
| ***H04W 72/115*** | (2023.01) |
| ***H04W 72/12*** | (2023.01) |
| ***H04W 74/08*** | (2024.01) |
| ***H04W 74/0808*** | (2024.01) |
| ***H04W 76/27*** | (2018.01) |
| ***H04W 76/28*** | (2018.01) |
| ***H04W 84/02*** | (2009.01) |
| ***H04W 88/02*** | (2009.01) |
| ***H04W 88/08*** | (2009.01) |
| ***H04W 92/02*** | (2009.01) |
| ***H04W 92/10*** | (2009.01) |

(52) U.S. Cl.

CPC ..... *H04W 56/0015* (2013.01); *H04W 56/003* (2013.01); *H04W 72/0446* (2013.01); *H04W 72/0453* (2013.01); *H04W 72/1215* (2013.01); *H04W 74/0808* (2013.01); *H04W 74/0891* (2013.01); *H04W 76/27* (2018.02); *H04W 76/28* (2018.02); *H04W 84/02* (2013.01); *H04W 88/02* (2013.01); *H04W 88/08* (2013.01); *H04W 92/02* (2013.01); *H04W 92/10* (2013.01)

(58) Field of Classification Search

CPC ......... H04W 72/02–569; H04W 74/002–0891; H04W 76/10–50; H04W 84/02–16; H04W 88/02–12; H04W 92/02–04; H04W 92/10

See application file for complete search history.

(56) References Cited

OTHER PUBLICATIONS

Qualcomm Incorporated: "Remaining Issues on CG Based SDT," 3GPP TSG-RAN2 Meeting #116-e, R2-2110761, Online, Nov. 1, 2021-Nov. 12, 2021, 6 Pages, Sections 2-3.

Supplementary European Search Report EP22938784 Search Authority the Hague Nov. 4, 2025.

TCL: "Discussion on CG based Small Data Transmission", 3GPP TSG-RAN WG2 Meeting #116e, R2-2111185, 3rd Generation Partnership Project (3GPP), Mobile Competence Centre, 650, Route Des Lucioles, F-06921 Sophia-Antipolis Cedex, France, vol. RAN WG2, No. Electronic, Nov. 1, 2021-Nov. 12, 2021, Oct. 22, 2021, 5 Pages, XP052067619, Section 2.4, p. 2-p. 4.

ZTE Corporation, et al., "RRM Requirements for SDT", 3G PP TSG-RAN4#101-e, R4-2118590, 3rd Generation Partnership Project (3GPP), Mobile Competence Centre, 650, Route Des Lucioles, F-06921 Sophia-Antipolis Cedex, France, vol. RAN WG4, No. Electronic meeting, Nov. 1, 2021-Nov. 12, 2021, Oct. 22, 2021, 4 Pages, XP052069979, Section 3, p. 2-p. 4.

ZTE, et al., "Discussion on Remaining Physical Layer Issues of Small Data Transmission", 3GPPTSG RAN WG1 #107-e, R1-2111356, 3rd Generation Partnership Project (3GPP), Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 6, 2021, 6 Pages, XP052074825, Section 2.3, p. 3.

CONFIGURED GRANT SMALL DATA TRANSMISSIONS IN AN UNLICENSED SPECTRUM

CROSS-REFERENCE TO RELATED APPLICATION

This patent application is a 371 national stage of PCT Application No. PCT/CN2022/088690, filed on Apr. 24, 2022, entitled "CONFIGURED GRANT SMALL DATA TRANSMISSIONS IN AN UNLICENSED SPECTRUM," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for configured grant (CG) small data transmissions (SDTs) in an unlicensed spectrum.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a network entity, a synchronization signal block (SSB); perform a measurement of the SSB during a measurement window for an unlicensed spectrum, wherein the measurement window is an extended measurement window as compared to a scheduled measurement window for a licensed carrier; and transmit, based at least in part on the measurement of the SSB during the measurement window, a configured grant small data transmission (CG-SDT) in the unlicensed spectrum to the network entity, wherein the CG-SDT is based at least in part on a timing alignment validation after the measurement window.

In some implementations, a method of wireless communication performed by a UE includes receiving, from a network entity, an SSB; performing a measurement of the SSB during a measurement window for an unlicensed spectrum, wherein the measurement window is an extended measurement window as compared to a scheduled measurement window for a licensed carrier; and transmitting, based at least in part on the measurement of the SSB during the measurement window, a CG-SDT in the unlicensed spectrum to the network entity, wherein the CG-SDT is based at least in part on a timing alignment validation after the measurement window.

In some implementations, a non-transitory computer-readable medium storing a set of instructions for wireless communication includes one or more instructions that, when executed by one or more processors of a UE, cause the UE to: receive, from a network entity, an SSB; perform a measurement of the SSB during a measurement window for an unlicensed spectrum, wherein the measurement window is an extended measurement window as compared to a scheduled measurement window for a licensed carrier; and transmit, based at least in part on the measurement of the SSB during the measurement window, a CG-SDT in the unlicensed spectrum to the network entity, wherein the CG-SDT is based at least in part on a timing alignment validation after the measurement window.

In some implementations, an apparatus for wireless communication includes means for receiving, from a network entity, an SSB; means for performing a measurement of the SSB during a measurement window for an unlicensed spectrum, wherein the measurement window is an extended measurement window as compared to a scheduled measurement window for a licensed carrier; and means for transmitting, based at least in part on the measurement of the SSB during the measurement window, a CG-SDT in the unlicensed spectrum to the network entity, wherein the CG-SDT is based at least in part on a timing alignment validation after the measurement window.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
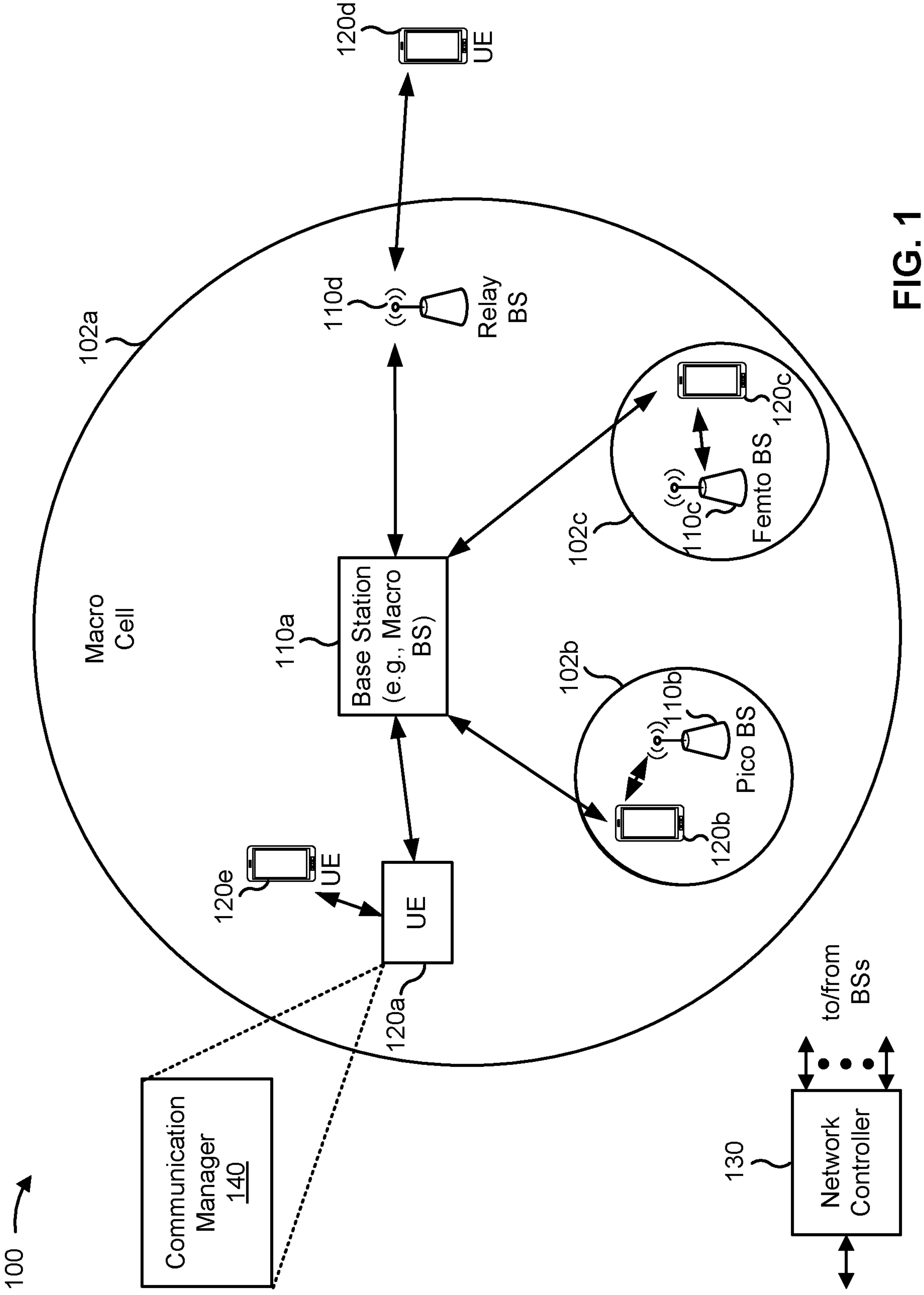
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHZ-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network entity, a synchronization signal block (SSB); perform a measurement of the SSB during a measurement window for an unlicensed spectrum, wherein the measurement window is an extended measurement window as compared to a scheduled measurement window for a licensed carrier; and transmit, based at least in part on the measurement of the SSB during the measurement window, a configured grant small data transmission (CG-SDT) in the unlicensed spectrum to the network entity, wherein the CG-SDT is based at least in part on a timing alignment validation after the measurement window. Additionally, or alternatively, the communication manager 140 may perform one or more other operations described herein.

As indicated above, FIG. 1 is provided as an example. Other examples may differ from what is described with regard to FIG. 1.

Figure 2:
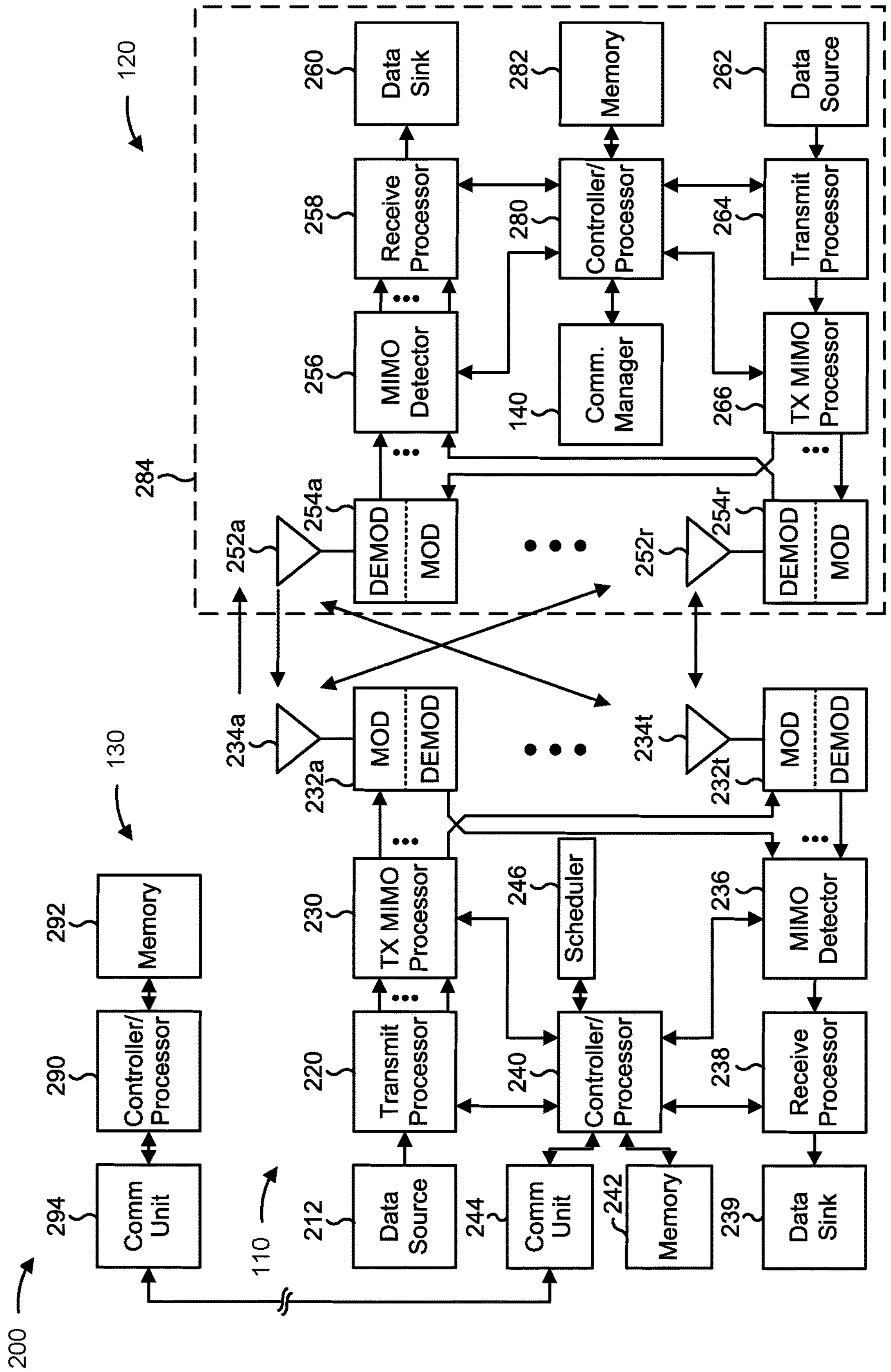
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234_a_ through 234_t_.

At the UE 120, a set of antennas 252 (shown as antennas 252_a_ through 252_r_) may receive the downlink signals from the base station 110 and/or other base stations 110 and may provide a set of received signals (e.g., R received signals) to a set of modems 254 (e.g., R modems), shown as modems 254_a_ through 254_r_. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term “controller/processor” may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234_a_ through 234_t_ and/or antennas 252_a_ through 252_r_) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-10).

The controller/processor 240 of the base station 110, the controller/processor 280 of the UE 120, and/or any other component(s) of FIG. 2 may perform one or more techniques associated with CG-SDTs in an unlicensed spectrum, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network entity, an SSB; means for performing a measurement of the SSB during a measurement window for an unlicensed spectrum, wherein the measurement window is an extended measurement window as compared to a scheduled measurement window for a licensed carrier; and/or means for transmitting, based at least in part on the measurement of the SSB during the measurement window, a CG-SDT in the unlicensed spectrum to the network entity, wherein the CG-SDT is based at least in part on a timing alignment validation after the measurement window. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
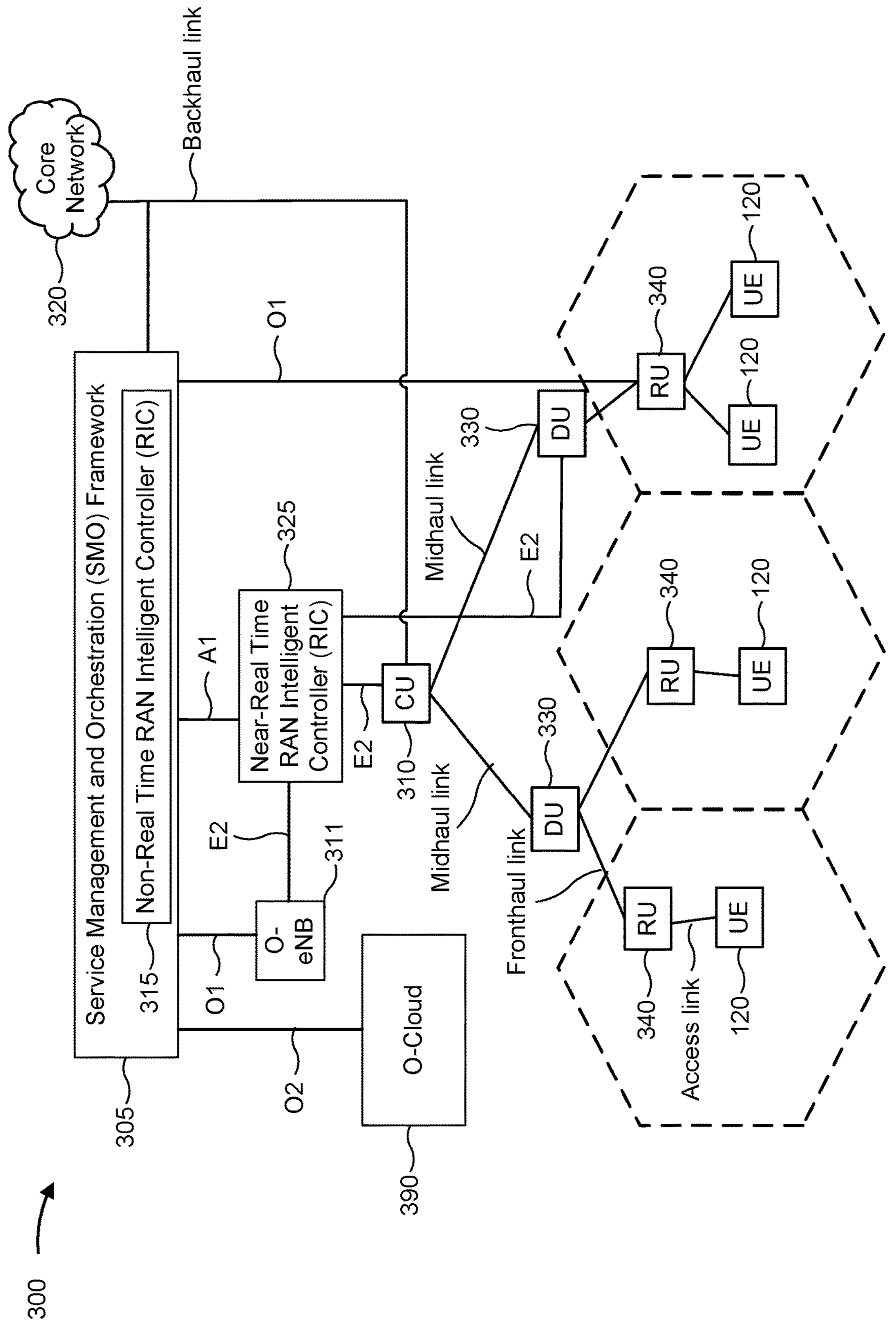
FIG. 3 is a diagram illustrating an example of a disaggregated base station architecture, in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
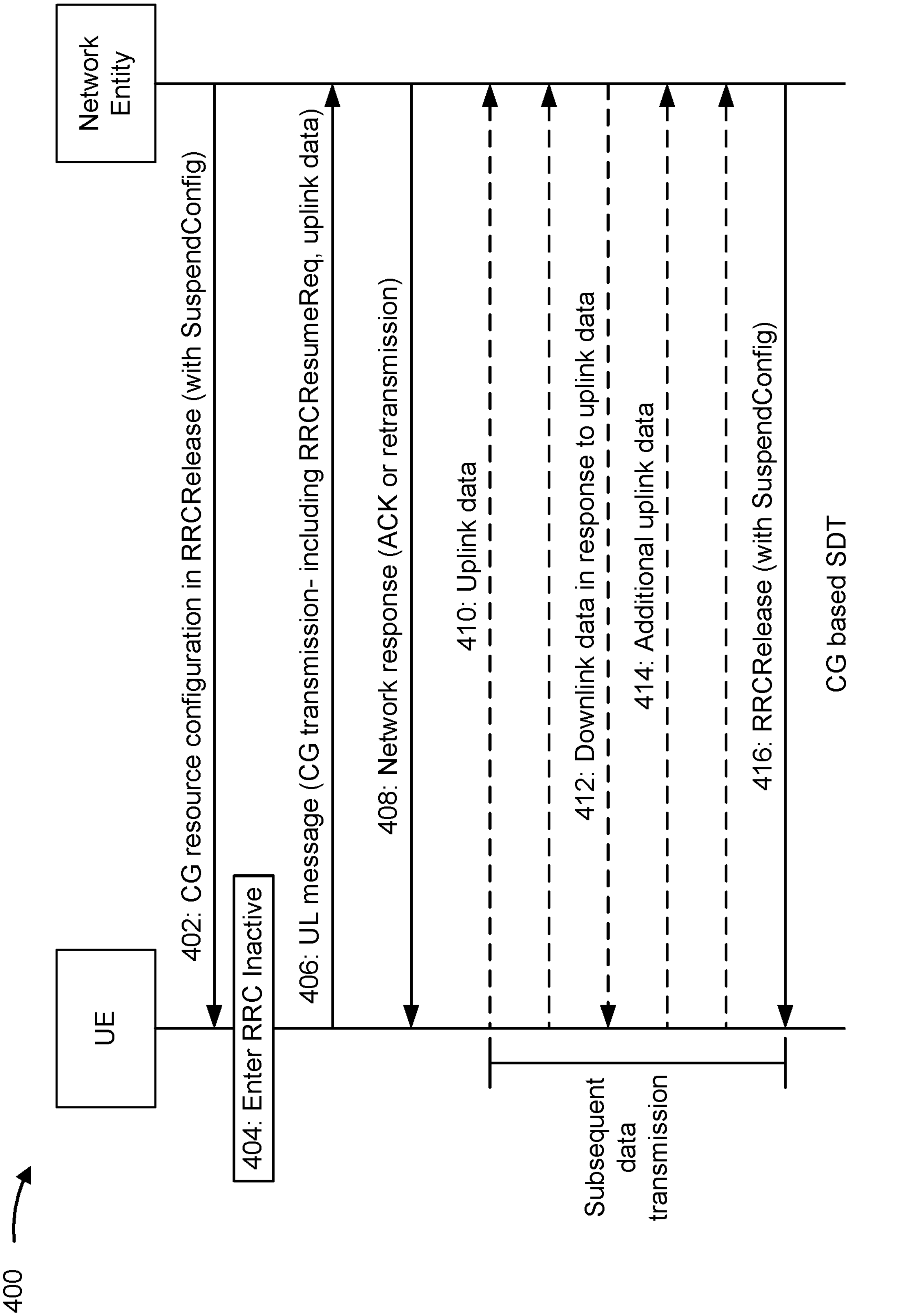
FIG. 4 is a diagram illustrating an example of a configured grant (CG) based small data transmission (SDT) procedure, in accordance with the present disclosure.

FIG. 4 is a diagram illustrating an example 400 of a CG based SDT procedure, in accordance with the present disclosure. As shown in FIG. 4, example 400 includes communication between a UE (e.g., UE 120) and a network entity (e.g., base station 110). In some aspects, the UE and the network entity may be included in a wireless network, such as wireless network 100.

As shown by reference number 402, in the CG based SDT procedure, the UE may receive, from the network entity, a radio resource control (RRC) release message, where the RRC release message may include a suspend configuration. The RRC release message may indicate a CG-SDT resource configuration. The CG-SDT resource configuration may indicate CG-SDT resources. The CG-SDT resource configuration may include one type-1 CG configuration. As shown by reference number 404, the UE may enter an RRC inactive state. The UE may support multiple CG-SDT configurations per carrier in the RRC inactive state based at least in part on a network configuration. As shown by reference number 406, the UE may transmit, to the network entity, an uplink message. The uplink message may be an initial CG transmission that indicates an RRC resume request and/or uplink data. The uplink data may be associated with an SDT, which may be appropriate for data that satisfies a data size threshold and for when the UE is in the RRC inactive state. The UE may transmit the uplink message based at least in part on the CG-SDT resources indicated by the CG-SDT resource configuration. As shown by reference number 408, the UE may receive, from the network entity, a network response. The network response may be an acknowledgement (ACK) or a retransmission. The network response may not include an RRC message.

As shown by reference number 410, as part of a subsequent data transmission, the UE may transmit uplink data to the network entity. As shown by reference number 412, the UE may receive, from the network entity, downlink data based at least in part on the uplink data. As shown by reference number 414, the UE may transmit additional data to the network entity. As shown by reference number 416, the UE may receive, from the network entity, another RRC release message with a suspend configuration. Thus, the RRC release message may also be used to reconfigure or release the CG-SDT resources when the UE is in the RRC inactive state. Further, for CG-SDT, the subsequent data transmission may use the CG-SDT resources or a downlink grant (DG), where a retransmission by DG for CG-SDT may be supported.

As indicated above, FIG. 4 is provided as an example. Other examples may differ from what is described with regard to FIG. 4.

In CG-based SDT, for an initial CG-SDT transmission, a UE may not select an SSB (e.g., the UE may not select any SSB) when no RSRP measurements associated with SSBs satisfy an RSRP measurement threshold. The UE may select a random access (RA)-SDT when RA-SDT criterion is met. For a subsequent CG-SDT transmission, for the purpose of CG resource selection, the UE may reevaluate the SSB.

In CG-based SDT, no new UE-specific radio network temporary identifier (RNTI) (e.g., an SDT-RNTI) may be defined for NR SDT. The UE may monitor a physical downlink control channel (PDCCH) addressed by a cell RNTI (C-RNTI) in CG-SDT. The C-RNTI may be previously configured during an RRC connected state of the UE. A configured scheduling (CS)-RNTI based dynamic retransmission mechanism may be used for CG-SDT.

In CG-based SDT, the UE may start a window after a CG/DG retransmission for CG-SDT. The UE may start the window based at least in part on a new timer or by reusing an existing timer. Multiple hybrid automatic repeat request (HARQ) processes may be supported for uplink CG-SDT. CG-SDT resources may be configured both on normal uplink (NUL) and supplementary uplink (SUL). An uplink carrier selection may be performed before a CG-SDT selection. The UE may release CG-SDT resources when a time alignment timer (TAT)-SDT expires during an RRC inactive state. The UE may release the CG-SDT resources (if stored) when the UE initiates an RRC resume procedure from another cell which is different from the cell in which an RRC release message is received.

The UE may be allowed to transmit an SDT using configured CG-SDT resources provided that the UE is synchronized toward (e.g., using a timing derived using a latest available timing value (e.g., $N_{TA}$)) a serving cell prior to transmission. When the UE is not able to obtain the synchronization toward the serving cell, the UE may drop the SDT. The UE may determine an SDT occasion according to a CG-SDT resource configuration.

When a CG-SDT RSRP change threshold (cg-SDT-RSRP-Change Threshold) is configured for a timing alignment validation based at least in part on an RSRP change criterion, the UE may be allowed to transmit using CG-SDT using the timing derived using the latest available timing value (e.g., $N_{TA}$) provided that a first RSRP measurement (RSRP1) and a second RSRP measurement (RSRP2) used in the timing alignment validation are valid measurements, and that the timing alignment validation for transmission using CG-SDT is valid according to validation criteria. The first RSRP measurement and the second RSRP measurement may be considered to be valid provided that certain conditions are met for FR1 and FR2.

For example, for a valid measurement for FR1, and for the first RSRP transmission, $(T1-\min(640\text{ ms}, M1*T_{DRX})) \leq T1' \leq (T1+\min(640\text{ ms}, M1*T_{DRX}))$ should be satisfied. For a valid measurement for FR1, and for the second RSRP transmission, $(T2-\min(640\text{ ms}, M1*T_{DRX})) \leq T2' \leq T2$ should be satisfied. For a valid measurement for FR2, and for the first RSRP transmission, $(T1-[X]) \leq T1' \leq (T1+[X])$ should be satisfied. For a valid measurement for FR2, and for the second RSRP transmission, $(T2-[X]) \leq T2' \leq T2$ should be satisfied. T1 is a time when a latest $N_{TA}$ Was obtained by the UE via a timing advance command medium access control control element (MAC-CE). T1' is a time when the UE has completed the first RSRP transmission. T2 is a time when the UE performs the timing alignment validation for transmission using CG-SDT. T2' is a time when the UE has completed the second RSRP transmission. $T_{DRX}$ is a discontinuous reception (DRX) cycle length (in ms). M1 is a scaling factor. X1 is a predefined value (e.g., 400 ms or 1.28 seconds). When at least one of the first RSRP measurement or the second RSRP measurement is considered to be invalid based at least in part on the above conditions, the UE may not validate the CG-SDT using the first RSRP measurement and the second RSRP measurement, and the UE may not transmit using CG-SDT.

Figure 5:
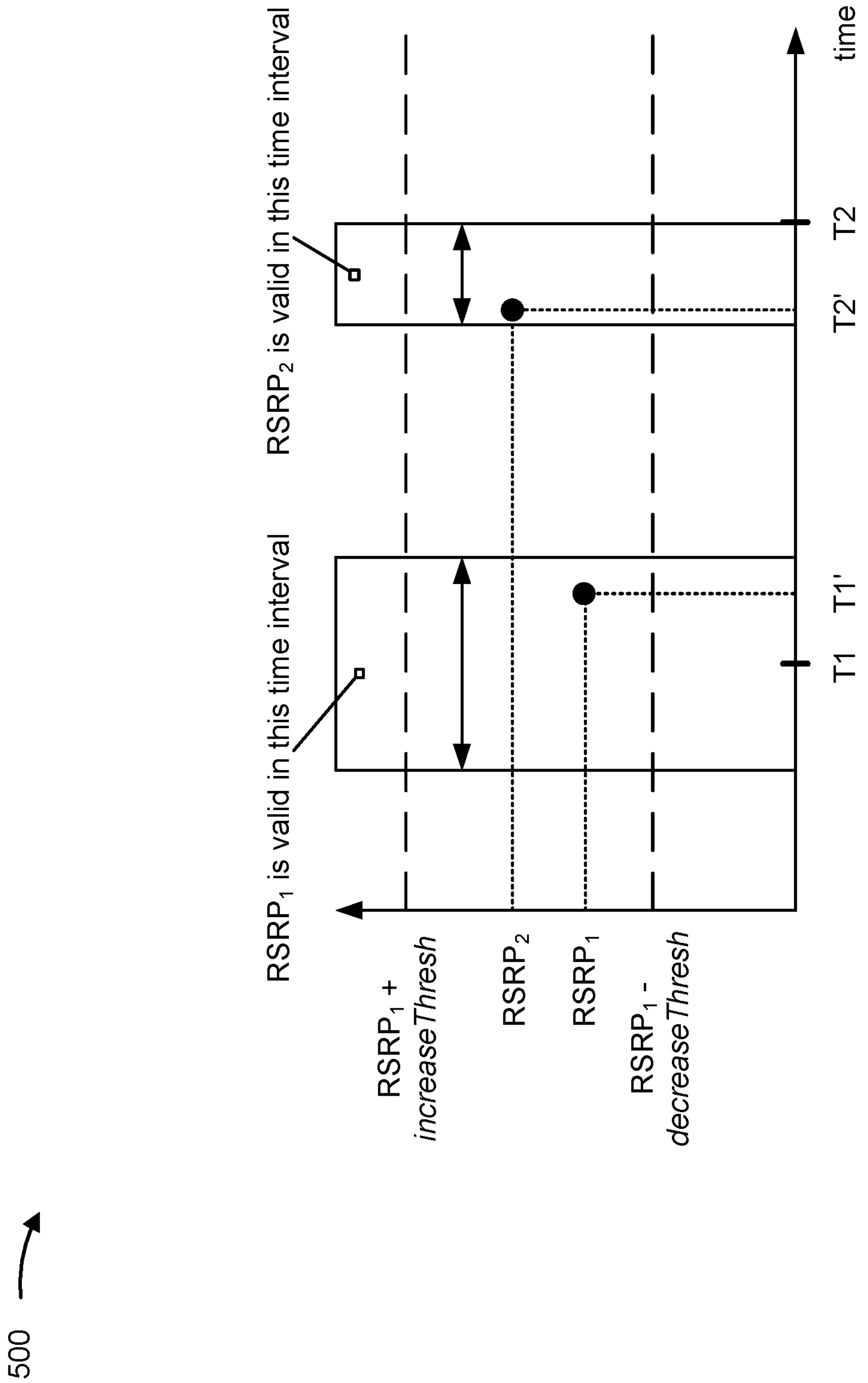
FIG. 5 is a diagram illustrating an example of a timing alignment validation for CG-SDT, in accordance with the present disclosure.

FIG. 5 is a diagram illustrating an example 500 of a timing alignment validation for CG-SDT, in accordance with the present disclosure.

As shown in FIG. 5, at T1, a UE may obtain a latest $N_{TA}$, and at T1', the UE may complete a first RSRP measurement (RSRP1) based at least in part on the latest $N_{TA}$. The first RSRP measurement may be subjected to an increase threshold and a decrease threshold. The first RSRP measurement may be valid for a first timing alignment validation window (or first measurement window for RSRP1), which may vary for FR1 and FR2. At T2', the UE may complete a second RSRP measurement (RSRP2), and at T2, the UE may perform a timing alignment validation for transmission using CG-SDT. The second RSRP measurement may be subjected to the increase threshold and the decrease threshold. The second RSRP measurement may be valid for a second timing alignment validation window (or second measurement window for RSRP2), which may vary for FR1 and FR2. The first RSRP measurement and the second RSRP measurement may be valid when within the increase threshold and the decrease threshold. The first RSRP measurement and the second RSRP measurement may be associated with SSB transmissions from a network entity.

As indicated above, FIG. 5 is provided as an example. Other examples may differ from what is described with regard to FIG. 5.

In unlicensed bands, devices such as a UE and a network entity may share a channel, so spectrum sensing may be used before transmissions. A device may detect, based at least in part on a listen-before-talk (LBT), whether the channel is free before performing a transmission. Otherwise, the device may wait until the channel is free. For NR unlicensed (NR-U), different types of channel access mechanisms may be employed. In load-based equipment (LBE), LBT may be applied prior to every single transmission. Thus, the device may transmit whenever there is data to transmit. In frame-based equipment (FBE), LBT may be applied on a fixed frame period based at least in part on having a controlled channel.

Figure 6:
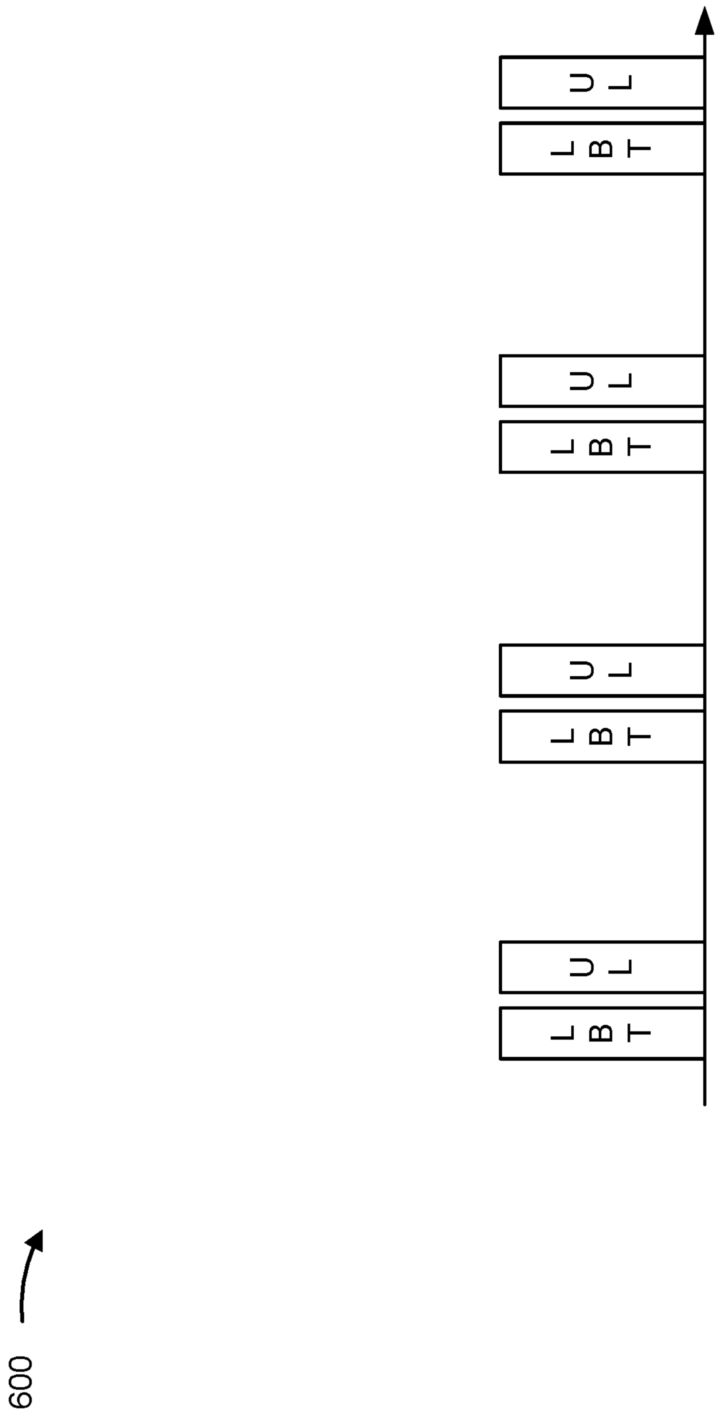
FIG. 6 is a diagram illustrating an example of a listen-before-talk (LBT) before an uplink transmission, in accordance with the present disclosure.

FIG. 6 is a diagram illustrating an example 600 of an LBT before an uplink transmission, in accordance with the present disclosure.

As shown in FIG. 6, in NR-U, an LBT may be performed before every single uplink transmission. A UE may perform the LBT before performing an uplink transmission to a network entity, where the uplink transmission may be an SDT from the UE to the network entity. The network entity may perform the LBT before performing an uplink transmission to the UE, where the uplink transmission may be an SSB transmission from the network entity to the UE.

As indicated above, FIG. 6 is provided as an example. Other examples may differ from what is described with regard to FIG. 6.

In NR-U, both a network entity and a UE may need to perform LBT before performing a transmission. During an LBT failure, the network entity may be unable to transmit an SSB and the UE may be unable to utilize CG-SDT resources. Since measurements (e.g., SSB RSRP measurements) are used to perform timing alignment validation for a CG-SDT, a lack of measurements due to the LBT failure may lead to measurement inaccuracy during the timing alignment validation. For example, when multiple measurements are needed when a measurement variation is high, a lack of SSB transmissions from the network entity due to the LBT failure during a measurement window may introduce the measurement inaccuracy at the UE, which may cause uncertainty in utilizing the CG-SDT resources because the UE cannot utilize SDT due to the LBT failure while the timing alignment validation is passed. The UE may have performed the timing alignment validation prior to the CG-SDT, but the UE cannot transmit using the CG-SDT resources when LBT has failed.

In various aspects of techniques and apparatuses described herein, a UE may receive, from a network entity, an SSB. The UE may perform a measurement (e.g., an SSB RSRP measurement) of the SSB during a measurement window for an unlicensed spectrum. The measurement window may be associated with a timing alignment validation (e.g., a CG-SDT timing alignment validation) in the unlicensed spectrum. The measurement window may be an extended measurement window as compared to a scheduled measurement window for a licensed carrier. The UE may transmit, based at least in part on the measurement of the SSB during the measurement window, a CG-SDT in the unlicensed spectrum to the network entity. The CG-SDT may be based at least in part on a based at least in part on the timing alignment validation, which may occur after the measurement window. The measurement window may be extended in the unlicensed spectrum to account for LBT failures, which may occur at the network entity, and which may cause the network entity to not transmit SSBs to the UE, which would otherwise affect a measurement accuracy and thereby the timing alignment validation and CG-SDT by the UE. By extending the measurement window, the UE may be provided with additional opportunities to perform measurements of SSBs, which may enable the UE to perform CG-SDTs in the presence of LBT failure.

Figure 7:
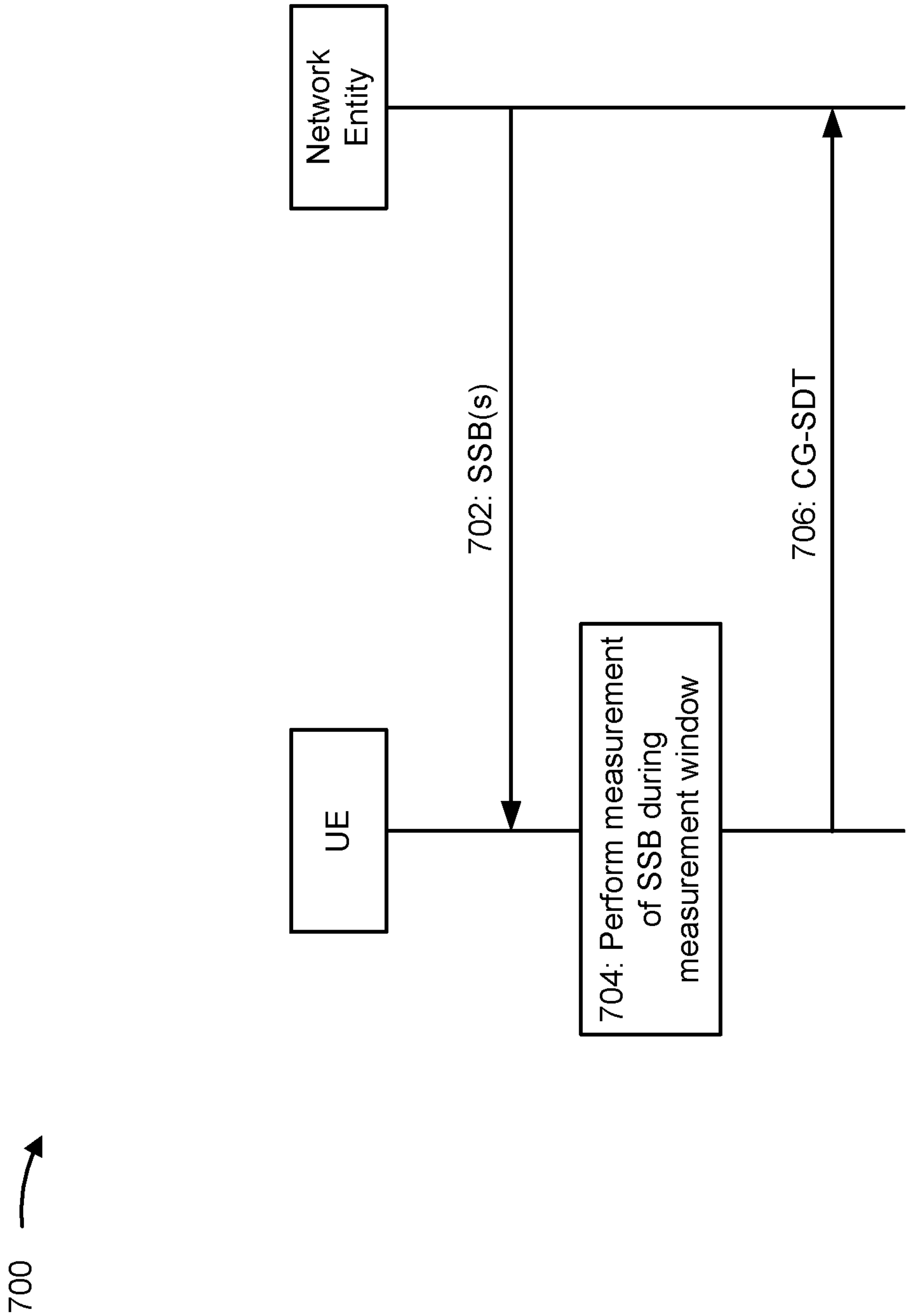
FIGS. 7-8 are diagrams illustrating examples associated with CG-SDTs in an unlicensed spectrum, in accordance with the present disclosure.

FIG. 7 is a diagram illustrating an example 700 associated with CG-SDTs in an unlicensed spectrum, in accordance with the present disclosure. As shown in FIG. 7, example 700 includes communication between a UE (e.g., UE 120) and a network entity (e.g., base station 110). In some aspects, the UE and the network entity may be included in a wireless network, such as wireless network 100.

As shown by reference number 702, the UE may receive, from the network entity, an SSB. The UE may receive a plurality of SSBs over a period of time. The UE may utilize the SSB to synchronize with the network entity for the purpose of performing CG SDTs to the network entity.

As shown by reference number 704, the UE may perform a measurement of the SSB during a measurement window. The measurement may be an RSRP SSB measurement. The measurement window may be associated with a CG-SDT timing alignment validation in an unlicensed spectrum. The measurement window may be an extended measurement window as compared to a scheduled measurement window for a licensed carrier. The measurement window may be "extended" because the measurement window may be longer than a typical measurement window to account for LBT failures. A duration of the extended measurement window for the unlicensed spectrum may be greater than a duration of the scheduled measurement window for the licensed carrier by a defined value. In other words, the extended measurement window for the unlicensed spectrum may be longer in time as compared to the scheduled measurement window for the licensed carrier. The defined value may be based at least in part on an operation mode of the unlicensed spectrum, where the operation mode may be LBE or FBE. The defined value may be based at least in part on a CG-SDT configuration received from the network entity. In other words, the duration of the extended measurement window may be based at least in part on the operation mode of the unlicensed spectrum (e.g., LBE or FBE), or the duration of the extended measurement window may be based at least in part on the CG-SDT configuration received from the network entity.

In some aspects, the duration of the CG-SDT timing alignment validation (e.g., the duration of the measurement window) in the unlicensed spectrum may be extended by X % as compared to the licensed carrier, which may result in an extended measurement window. The UE may start performing the RSRP measurement X % earlier than an originally scheduled window. The value of X may be defined per the operation mode of the unlicensed spectrum (e.g., LBE or FBE). The value of X may be configured by the network entity as part of the CG-SDT configuration, which may be received by the UE from the network entity. The extended measurement window may allow the UE additional opportunities to receive SSB transmissions from the network entity, even when LBT failure occurs at the network entity, which may prevent the network entity from transmitting some SSBs to the UE.

In some aspects, the originally scheduled window may be associated with an RSRP1 measurement window, and the extended measurement window may be associated with an RSRP2 measurement window. The RSRP1 measurement window and the RSRP2 measurement window may be associated with T1' and T2', respectively, as described in connection with FIG. 5. The extended measurement window for timing alignment validation may be determined based at least in part on an SSB transmission sampled during the originally scheduled window for RSRP1. In other words, the extended measurement window for timing alignment validation may be determined by a measured SSB sampled during an earlier measurement window for RSRP1.

In some aspects, when Y % of SSBs received from the network entity are measured within the originally scheduled window for CG-SDT, or not more than (100-Y) % of SSBs received from the network entity are skipped due to LBT failure, the extended measurement window may not be used and rather the originally scheduled window for CG-SDT may be used. The originally scheduled window may be X % smaller than the extended measurement window. The originally scheduled window may be associated with the RSRP1 measurement window. In other words, the Y % of SSBs received from the network entity may be measured within the originally scheduled window for CG-SDT due to a lack of LBT failure, so in this case, the extended measurement window may not be needed. Rather, the extended measurement window may be needed when LBT failure is present, and as a result, fewer SSB transmissions are being received at the UE from the network entity.

As shown by reference number 706, the UE may transmit, based at least in part on the measurement of the SSB during the measurement window, a CG-SDT to the network entity based at least in part on a timing alignment validation after the measurement window. The UE may transmit the CG-SDT based at least in part on the timing alignment validation, which may occur after the measurement window. Based at least in part on the timing alignment validation, the UE may be permitted to perform the CG-SDT to the network entity.

In some aspects, the UE may determine that a quantity (or percentage) of SSBs are not detected during the measurement window due to an LBT failure at the network entity. The UE may disable CG-SDT resources for a period of time based at least in part on the quantity (or percentage) of SSBs not being detected during the measurement window. The UE may perform a subsequent timing alignment validation in a subsequent CG-SDT occasion based at least in part on the CG-SDT resources being disabled for the period of time due to the LBT failure.

In some aspects, the UE may temporarily disable CG-SDTs to the network entity. When more than Z % of SSBs are not detected due to the LBT failure at the network entity, the UE may temporarily disable or deactivate corresponding CG-SDT resources. A CG-SDT skipped in the unlicensed band may differ, in terms of a UE behavior, from skipping a CG-SDT in the licensed spectrum. For example, in the licensed band, after the CG-SDT is dropped, a normal random access channel (RACH) may be considered. In the unlicensed band, the UE may attempt to evaluate a timing alignment validation and use the CG-SDT in a next CG-SDT occasion when the CG-SDT is skipped due to the LBT failure, which may be allowed for A times that a CG-SDT is skipped due to the LBT failure or for B ms of a CG-SDT skipped duration.

In some aspects, the UE may receive, from the network entity, the CG-SDT configuration, which may indicate various parameters, such as X, Y, Z, A, and/or B. The UE may determine the extended measurement window based at least in part on X. The UE may determine whether to use the originally scheduled window based at least in part on Y. The UE may determine whether to temporarily disable/deactivate certain CG-SDT resources based at least in part on Z. The UE may determine to evaluate the timing alignment validation and use the CG-SDT in the next CG-SDT occasion based at least in part on A and/or B.

In some aspects, the CG-SDT may be associated with the CG-SDT occasion, and multiple CG-SDT resource candidates may be associated with the CG-SDT occasion. The multiple CG-SDT resource candidates associated with the CG-SDT occasion may be applicable to an LBE-based access. The UE may determine an LBT failure at the UE prior to the CG-SDT, and the UE may use, based at least in part on the LBT failure at the UE, a subsequent CG-SDT resource candidate of the CG-SDT occasion. The UE may skip a subsequent timing alignment validation for the subsequent CG-SDT resource candidate based at least in part on the UE passing the timing alignment validation but skipping the CG-SDT due to the LBT failure at the UE. Further, skipping subsequent timing alignment validations may be permitted a defined quantity of times from an initial CG-SDT skipping.

In some aspects, multiple CG-SDT resource candidates may be associated with each CG-SDT occasion. When the UE fails an LBT prior to the CG-SDT, the UE may use a following CG-SDT resource candidate in the same CG-SDT occasion for a next attempt, which may occur before the UE attempts to use a CG-SDT resource candidate of the next CG-SDT occasion. A previous measurement may still be considered as valid for timing alignment validation when applied to the following CG-SDT resource candidate (or multiple following CG-SDT resource candidates) in the same CG-SDT occasion.

In some aspects, the UE may skip the timing alignment validation for CG-SDT resource candidates when the UE passes an initial timing alignment validation, but the UE skips an initial CG-SDT due to LBT failure. In other words, the UE may pass the initial timing alignment validation, but the UE may skip the initial CG-SDT due to the LBT failure. In this case, the UE may skip the timing alignment validation for the CG-SDT resource candidates, which may correspond to a next timing alignment validation for next CG-SDT resource candidates, since the UE already passed the initial timing alignment validation. Skipping the timing alignment validation may be allowed only for a first C times from an initial CG-SDT skip, where C may be indicated in the CG-SDT configuration received from the network entity. When the CG-SDT is dropped due to UE LBT failure after the timing alignment validation is successful, the CG-SDT dropping may be different than skipping a CG-SDT in the licensed spectrum (e.g., in terms of a UE behavior after the CG-SDT skipping, and an availability of CG-SDT resources after the CG-SDT dropping).

As indicated above, FIG. 7 is provided as an example. Other examples may differ from what is described with regard to FIG. 7.

Figure 8:
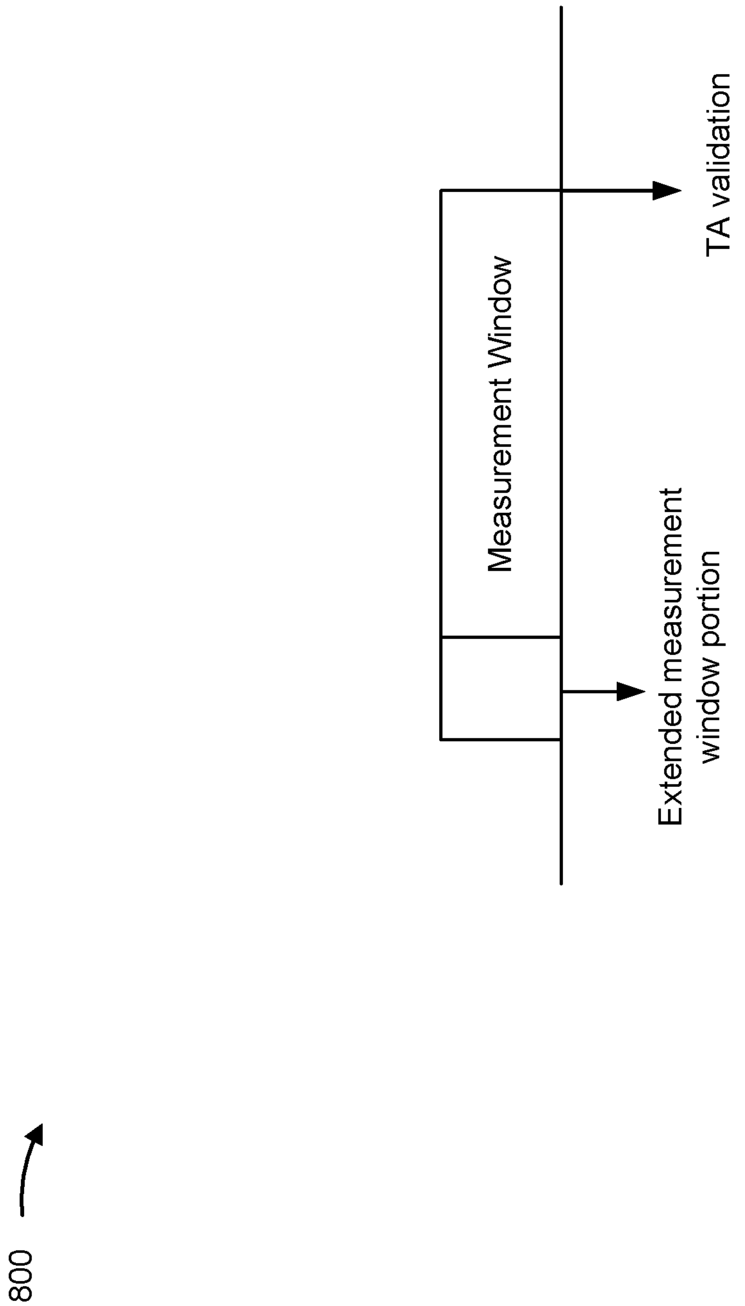

FIG. 8 is a diagram illustrating an example 800 associated with CG-SDTs in an unlicensed spectrum, in accordance with the present disclosure.

As shown in FIG. 8, a measurement window (e.g., an originally scheduled window) may be combined with an extended measurement window portion to form an extended measurement window. The extended measurement window portion may be associated with a value of X, which may cause the extended measurement window portion to be a portion of the measurement window. The extended measurement window may be used when LBT failure is present, which may cause fewer SSB transmissions to be received during only the measurement window. The extended measurement window portion may provide a UE with additional opportunities to receive SSB transmissions from a network entity, where measurements (e.g., SSB RSRP measurements) associated with the SSB transmissions may be used for a timing alignment validation and performing a CG-SDT in the unlicensed spectrum to the network entity based at least in part on the timing alignment validation.

As indicated above, FIG. 8 is provided as an example. Other examples may differ from what is described with regard to FIG. 8.

Figure 9:
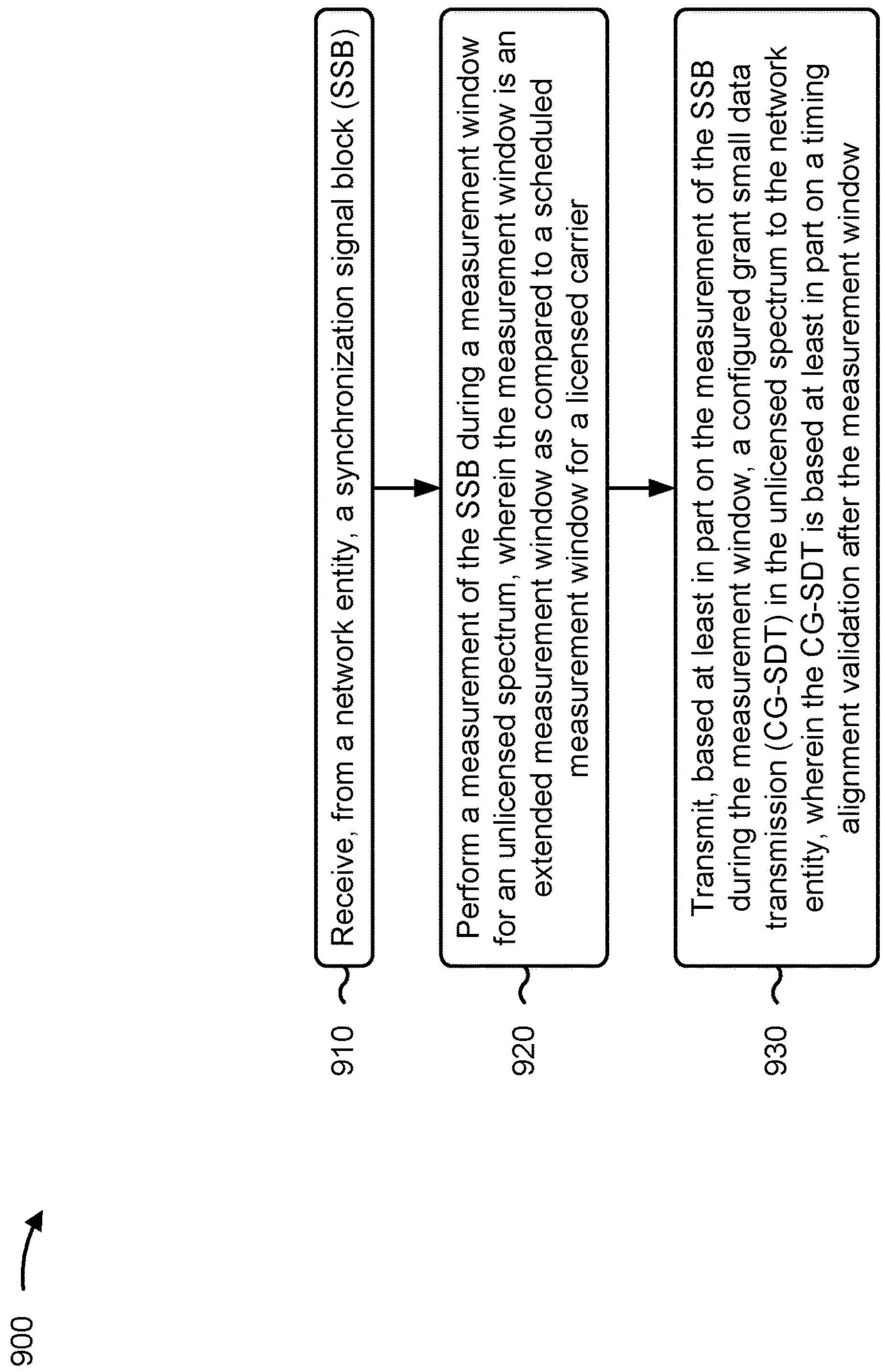
FIG. 9 is a diagram illustrating an example process associated with CG-SDTs in an unlicensed spectrum, in accordance with the present disclosure.

FIG. 9 is a diagram illustrating an example process 900 performed, for example, by a UE, in accordance with the present disclosure. Example process 900 is an example where the UE (e.g., UE 120) performs operations associated with CG-SDTs in an unlicensed spectrum.

As shown in FIG. 9, in some aspects, process 900 may include receiving, from a network entity, an SSB (block 910). For example, the UE (e.g., using communication manager 140 and/or reception component 1002, depicted in FIG. 10) may receive, from a network entity, an SSB, as described above.

As further shown in FIG. 9, in some aspects, process 900 may include performing a measurement of the SSB during a measurement window for an unlicensed spectrum, wherein the measurement window is an extended measurement window as compared to a scheduled measurement window for a licensed carrier (block 920). For example, the UE (e.g., using communication manager 140 and/or measurement component 1008, depicted in FIG. 10) may perform a measurement of the SSB during a measurement window for an unlicensed spectrum, wherein the measurement window is an extended measurement window as compared to a scheduled measurement window for a licensed carrier, as described above.

As further shown in FIG. 9, in some aspects, process 900 may include transmitting, based at least in part on the measurement of the SSB during the measurement window, a CG-SDT in the unlicensed spectrum to the network entity, wherein the CG-SDT is based at least in part on a timing alignment validation after the measurement window (block 930). For example, the UE (e.g., using communication manager 140 and/or transmission component 1004, depicted in FIG. 10) may transmit, based at least in part on the measurement of the SSB during the measurement window, a CG-SDT in the unlicensed spectrum to the network entity, wherein the CG-SDT is based at least in part on a timing alignment validation after the measurement window, as described above.

Process 900 may include additional aspects, such as any single aspect or any combination of aspects described below and/or in connection with one or more other processes described elsewhere herein.

In a first aspect, a duration of the extended measurement window for the unlicensed spectrum is greater than a duration of the scheduled measurement window for the licensed carrier by a defined value.

In a second aspect, alone or in combination with the first aspect, the defined value is based at least in part on an operation mode of the unlicensed spectrum, and the operation mode is LBE or FBE.

In a third aspect, alone or in combination with one or more of the first and second aspects, the defined value is based at least in part on a CG-SDT configuration received from the network entity.

In a fourth aspect, alone or in combination with one or more of the first through third aspects, process 900 includes determining that a quantity of SSBs are not detected during the measurement window due to an LBT failure at the network entity, and disabling CG-SDT resources for a period of time based at least in part on the quantity of SSBs not being detected during the measurement window.

In a fifth aspect, alone or in combination with one or more of the first through fourth aspects, process 900 includes performing a subsequent timing alignment validation in a subsequent CG-SDT occasion based at least in part on the CG-SDT resources being disabled for the period of time due to the LBT failure.

In a sixth aspect, alone or in combination with one or more of the first through fifth aspects, the CG-SDT is associated with a CG-SDT occasion, and multiple CG-SDT resource candidates are associated with the CG-SDT occasion.

In a seventh aspect, alone or in combination with one or more of the first through sixth aspects, process 900 includes determining an LBT failure at the UE prior to the CG-SDT, and using, based at least in part on the LBT failure at the UE, a subsequent CG-SDT resource candidate of the CG-SDT occasion.

In an eighth aspect, alone or in combination with one or more of the first through seventh aspects, process 900 includes skipping a subsequent timing alignment validation for the subsequent CG-SDT resource candidate based at least in part on the UE passing the timing alignment validation but skipping the CG-SDT due to the LBT failure at the UE, wherein skipping subsequent timing alignment validations is permitted a defined quantity of times from an initial CG-SDT skipping.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
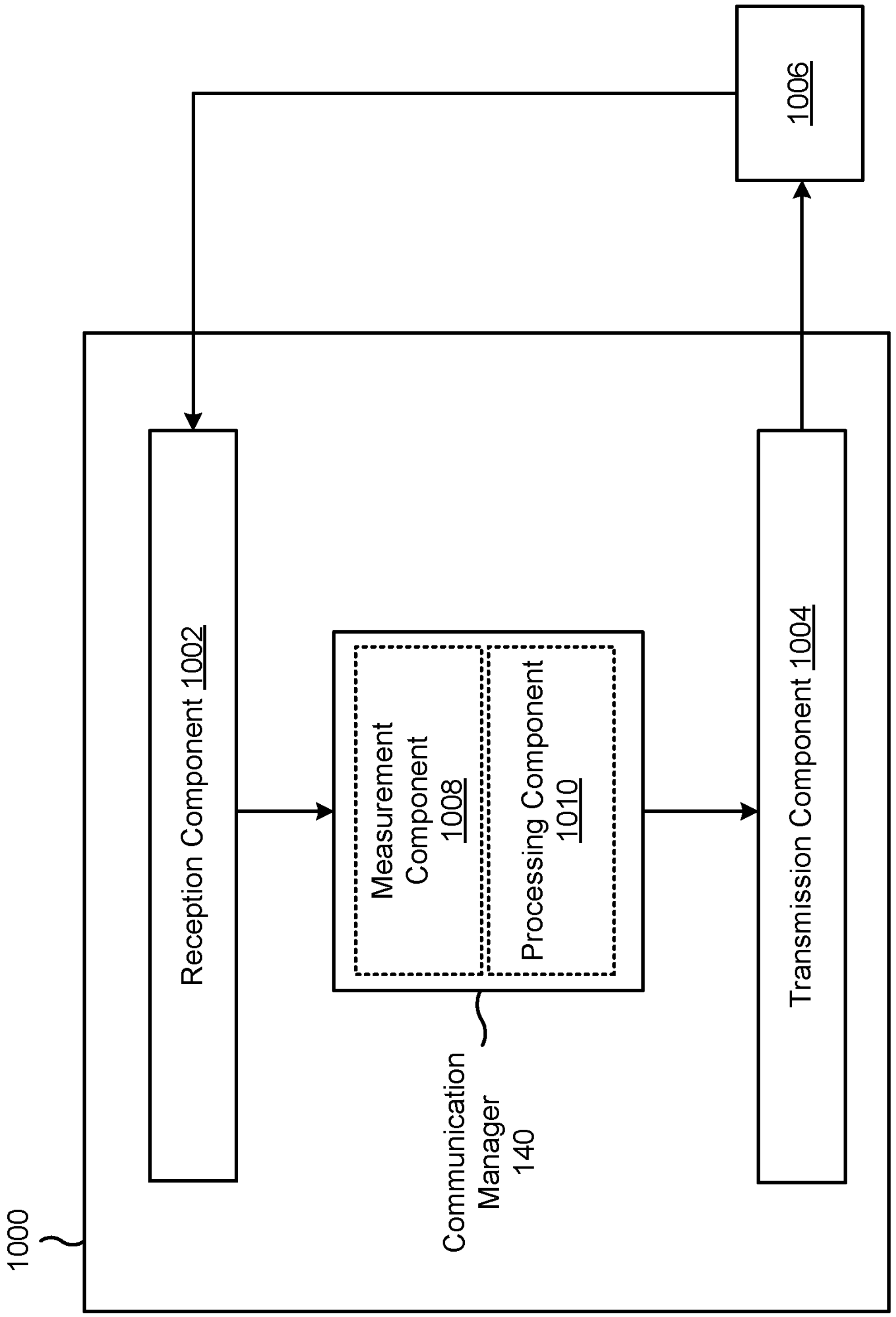
FIG. 10 is a diagram of an example apparatus for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a measurement component 1008, or a processing component 1010, among other examples.

In some aspects, the apparatus 1000 may be configured to perform one or more operations described herein in connection with FIGS. 7-8. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a network entity, an SSB. The measurement component 1008 may perform a measurement of the SSB during a measurement window for an unlicensed spectrum, wherein the measurement window is an extended measurement window as compared to a scheduled measurement window for a licensed carrier. The transmission component 1004 may transmit, based at least in part on the measurement of the SSB during the measurement window, a CG-SDT in the unlicensed spectrum to the network entity, wherein the CG-SDT is based at least in part on a timing alignment validation after the measurement window.

The processing component 1010 may determine that a quantity of SSBs are not detected during the measurement window due to an LBT failure at the network entity. The processing component 1010 may disable CG-SDT resources for a period of time based at least in part on the quantity of SSBs not being detected during the measurement window. The processing component 1010 may perform a subsequent timing alignment validation in a subsequent CG-SDT occasion based at least in part on the CG-SDT resources being disabled for the period of time due to the LBT failure.

The processing component 1010 may determine an LBT failure at the UE prior to the CG-SDT. The processing component 1010 may use, based at least in part on the LBT failure at the UE, a subsequent CG-SDT resource candidate of the CG-SDT occasion. The processing component 1010 may skip a subsequent timing alignment validation for the subsequent CG-SDT resource candidate based at least in part on the UE passing the timing alignment validation but skipping the CG-SDT due to the LBT failure at the UE, wherein skipping subsequent timing alignment validations is permitted a defined quantity of times from an initial CG-SDT skipping.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a network entity, a synchronization signal block (SSB); performing a measurement of the SSB during a measurement window for an unlicensed spectrum, wherein the measurement window is an extended measurement window as compared to a scheduled measurement window for a licensed carrier; and transmitting, based at least in part on the measurement of the SSB during the measurement window, a configured grant small data transmission (CG-SDT) in the unlicensed spectrum to the network entity, wherein the CG-SDT is based at least in part on a timing alignment validation after the measurement window.

Aspect 2: The method of Aspect 10, wherein a duration of the extended measurement window for the unlicensed spectrum is greater than a duration of the scheduled measurement window for the licensed carrier by a defined value.

Aspect 3: The method of Aspect 11, wherein the defined value is based at least in part on an operation mode of the unlicensed spectrum, and wherein the operation mode is load-based equipment or frame-based equipment.

Aspect 4: The method of Aspect 11, wherein the defined value is based at least in part on a CG-SDT configuration received from the network entity.

Aspect 5: The method of Aspect 10, further comprising: determining that a quantity of SSBs are not detected during the measurement window due to a listen-before-talk (LBT) failure at the network entity; and disabling CG-SDT resources for a period of time based at least in part on the quantity of SSBs not being detected during the measurement window.

Aspect 6: The method of Aspect 14, further comprising: performing a subsequent timing alignment validation in a subsequent CG-SDT occasion based at least in part on the CG-SDT resources being disabled for the period of time due to the LBT failure.

Aspect 7: The method of Aspect 11, wherein the CG-SDT is associated with a CG-SDT occasion, and wherein multiple CG-SDT resource candidates are associated with the CG-SDT occasion.

Aspect 8: The method of Aspect 16, further comprising: determining a listen-before-talk (LBT) failure at the UE prior to the CG-SDT; and using, based at least in part on the LBT failure at the UE, a subsequent CG-SDT resource candidate of the CG-SDT occasion.

Aspect 9: The method of Aspect 17, further comprising: skipping a subsequent timing alignment validation for the subsequent CG-SDT resource candidate based at least in part on the UE passing the timing alignment validation but skipping the CG-SDT due to the LBT failure at the UE, wherein skipping subsequent timing alignment validations is permitted a defined quantity of times from an initial CG-SDT skipping.

Aspect 10: An apparatus for wireless communication at a device, comprising a processor; memory coupled with the processor; and instructions stored in the memory and executable by the processor to cause the apparatus to perform the method of one or more of Aspects 1-9.

Aspect 11: A device for wireless communication, comprising a memory and one or more processors coupled to the memory, the one or more processors configured to perform the method of one or more of Aspects 1-9.

Aspect 12: An apparatus for wireless communication, comprising at least one means for performing the method of one or more of Aspects 1-9.

Aspect 13: A non-transitory computer-readable medium storing code for wireless communication, the code comprising instructions executable by a processor to perform the method of one or more of Aspects 1-9.

Aspect 14: A non-transitory computer-readable medium storing a set of instructions for wireless communication, the set of instructions comprising one or more instructions that, when executed by one or more processors of a device, cause the device to perform the method of one or more of Aspects 1-9.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of")

What is claimed is:

1. An apparatus for wireless communication at a user equipment (UE), comprising:

a memory; and one or more processors, coupled to the memory, configured to:

receive, from a network entity, a synchronization signal block (SSB);

perform a measurement of the SSB during a measurement window for an unlicensed spectrum, wherein the measurement window is an extended measurement window as compared to a scheduled measurement window for a licensed carrier; and transmit, based at least in part on the measurement of the SSB during the measurement window, a configured grant small data transmission (CG-SDT) in the unlicensed spectrum to the network entity, wherein the CG-SDT is based at least in part on a timing alignment validation after the measurement window.

2. The apparatus of claim 1, wherein a duration of the extended measurement window for the unlicensed spectrum is greater than a duration of the scheduled measurement window for the licensed carrier by a defined value.

3. The apparatus of claim 2, wherein the defined value is based at least in part on an operation mode of the unlicensed spectrum, and wherein the operation mode is load-based equipment or frame-based equipment.

4. The apparatus of claim 2, wherein the defined value is based at least in part on a CG-SDT configuration received from the network entity.

5. The apparatus of claim 1, wherein the one or more processors are further configured to:

determine that a quantity of SSBs are not detected during the measurement window due to a listen-before-talk (LBT) failure at the network entity; and disable CG-SDT resources for a period of time based at least in part on the quantity of SSBs not being detected during the measurement window.

6. The apparatus of claim 5, wherein the one or more processors are further configured to:

perform a subsequent timing alignment validation in a subsequent CG-SDT occasion based at least in part on the CG-SDT resources being disabled for the period of time due to the LBT failure.

7. The apparatus of claim 1, wherein the CG-SDT is associated with a CG-SDT occasion, and wherein multiple CG-SDT resource candidates are associated with the CG-SDT occasion.

8. The apparatus of claim 7, wherein the one or more processors are further configured to:

determine a listen-before-talk (LBT) failure at the UE prior to the CG-SDT; and use, based at least in part on the LBT failure at the UE, a subsequent CG-SDT resource candidate of the CG-SDT occasion.

9. The apparatus of claim 8, wherein the one or more processors are further configured to:

skip a subsequent timing alignment validation for the subsequent CG-SDT resource candidate based at least in part on the UE passing the timing alignment validation but skipping the CG-SDT due to the LBT failure at the UE, wherein skipping subsequent timing alignment validations is permitted a defined quantity of times from an initial CG-SDT skipping.

10. A method of wireless communication performed by a user equipment (UE), comprising:

receiving, from a network entity, a synchronization signal block (SSB);

performing a measurement of the SSB during a measurement window for an unlicensed spectrum, wherein the measurement window is an extended measurement window as compared to a scheduled measurement window for a licensed carrier; and transmitting, based at least in part on the measurement of the SSB during the measurement window, a configured grant small data transmission (CG-SDT) in the unlicensed spectrum to the network entity, wherein the CG-SDT is based at least in part on a timing alignment validation after the measurement window.

11. The method of claim 10, wherein a duration of the extended measurement window for the unlicensed spectrum is greater than a duration of the scheduled measurement window for the licensed carrier by a defined value.

12. The method of claim 11, wherein the defined value is based at least in part on an operation mode of the unlicensed spectrum, and wherein the operation mode is load-based equipment or frame-based equipment.

13. The method of claim 11, wherein the defined value is based at least in part on a CG-SDT configuration received from the network entity.

14. The method of claim 10, further comprising: determining that a quantity of SSBs are not detected during the measurement window due to a listen-before-talk (LBT) failure at the network entity; and disabling CG-SDT resources for a period of time based at least in part on the quantity of SSBs not being detected during the measurement window.

15. The method of claim 14, further comprising: performing a subsequent timing alignment validation in a subsequent CG-SDT occasion based at least in part on the CG-SDT resources being disabled for the period of time due to the LBT failure.

16. The method of claim 11, wherein the CG-SDT is associated with a CG-SDT occasion, and wherein multiple CG-SDT resource candidates are associated with the CG-SDT occasion.

17. The method of claim 16, further comprising: determining a listen-before-talk (LBT) failure at the UE prior to the CG-SDT; and using, based at least in part on the LBT failure at the UE, a subsequent CG-SDT resource candidate of the CG-SDT occasion.

18. The method of claim 17, further comprising: skipping a subsequent timing alignment validation for the subsequent CG-SDT resource candidate based at least in part on the UE passing the timing alignment validation but skipping the CG-SDT due to the LBT failure at the UE, wherein skipping subsequent timing alignment validations is permitted a defined quantity of times from an initial CG-SDT skipping.

19. A non-transitory computer-readable medium storing a set of instructions for wireless communication, the set of instructions comprising:
one or more instructions that, when executed by one or more processors of a user equipment (UE), cause the UE to:
receive, from a network entity, a synchronization signal block (SSB);
perform a measurement of the SSB during a measurement window for an unlicensed spectrum, wherein the measurement window is an extended measurement window as compared to a scheduled measurement window for a licensed carrier; and
transmit, based at least in part on the measurement of the SSB during the measurement window, a configured grant small data transmission (CG-SDT) in the unlicensed spectrum to the network entity, wherein the CG-SDT is based at least in part on a timing alignment validation after the measurement window.

20. The non-transitory computer-readable medium of claim 19, wherein a duration of the extended measurement window for the unlicensed spectrum is greater than a duration of the scheduled measurement window for the licensed carrier by a defined value.

21. The non-transitory computer-readable medium of claim 20, wherein:
the defined value is based at least in part on an operation mode of the unlicensed spectrum, and wherein the operation mode is load-based equipment or frame-based equipment; or
the defined value is based at least in part on a CG-SDT configuration received from the network entity.

22. The non-transitory computer-readable medium of claim 19, wherein the one or more instructions further cause the UE to:
determine that a quantity of SSBs are not detected during the measurement window due to a listen-before-talk (LBT) failure at the network entity;
disable CG-SDT resources for a period of time based at least in part on the quantity of SSBs not being detected during the measurement window; and
perform a subsequent timing alignment validation in a subsequent CG-SDT occasion based at least in part on the CG-SDT resources being disabled for the period of time due to the LBT failure.

23. The non-transitory computer-readable medium of claim 19, wherein the CG-SDT is associated with a CG-SDT occasion, and wherein multiple CG-SDT resource candidates are associated with the CG-SDT occasion.

24. The non-transitory computer-readable medium of claim 23, wherein the one or more instructions further cause the UE to:
determine a listen-before-talk (LBT) failure at the UE prior to the CG-SDT;
use, based at least in part on the LBT failure at the UE, a subsequent CG-SDT resource candidate of the CG-SDT occasion; and
skip a subsequent timing alignment validation for the subsequent CG-SDT resource candidate based at least in part on the UE passing the timing alignment validation but skipping the CG-SDT due to the LBT failure at the UE, wherein skipping subsequent timing alignment validations is permitted a defined quantity of times from an initial CG-SDT skipping.

25. An apparatus for wireless communication, comprising:
means for receiving, from a network entity, a synchronization signal block (SSB);
means for performing a measurement of the SSB during a measurement window for an unlicensed spectrum, wherein the measurement window is an extended measurement window as compared to a scheduled measurement window for a licensed carrier; and
means for transmitting, based at least in part on the measurement of the SSB during the measurement window, a configured grant small data transmission (CG-SDT) in the unlicensed spectrum to the network entity, wherein the CG-SDT is based at least in part on a timing alignment validation after the measurement window.

26. The apparatus of claim 25 wherein a duration of the extended measurement window for the unlicensed spectrum is greater than a duration of the scheduled measurement window for the licensed carrier by a defined value.

27. The apparatus of claim 26, wherein:
the defined value is based at least in part on an operation mode of the unlicensed spectrum, and wherein the operation mode is load-based equipment or frame-based equipment; or
the defined value is based at least in part on a CG-SDT configuration received from the network entity.

28. The apparatus of claim 25, further comprising:
means for determining that a quantity of SSBs are not detected during the measurement window due to a listen-before-talk (LBT) failure at the network entity;
means for disabling CG-SDT resources for a period of time based at least in part on the quantity of SSBs not being detected during the measurement window; and
means for performing a subsequent timing alignment validation in a subsequent CG-SDT occasion based at least in part on the CG-SDT resources being disabled for the period of time due to the LBT failure.

29. The apparatus of claim 25, wherein the CG-SDT is associated with a CG-SDT occasion, and wherein multiple CG-SDT resource candidates are associated with the CG-SDT occasion.

30. The apparatus of claim 29, further comprising:

means for determining a listen-before-talk (LBT) failure at the apparatus prior to the CG-SDT;

means for using, based at least in part on the LBT failure at the apparatus, a subsequent CG-SDT resource candidate of the CG-SDT occasion; and means for skipping a subsequent timing alignment validation for the subsequent CG-SDT resource candidate based at least in part on the apparatus passing the timing alignment validation but skipping the CG-SDT due to the LBT failure at the apparatus, wherein skipping subsequent timing alignment validations is permitted a defined quantity of times from an initial CG-SDT skipping.

* * * * *